Figure 1:
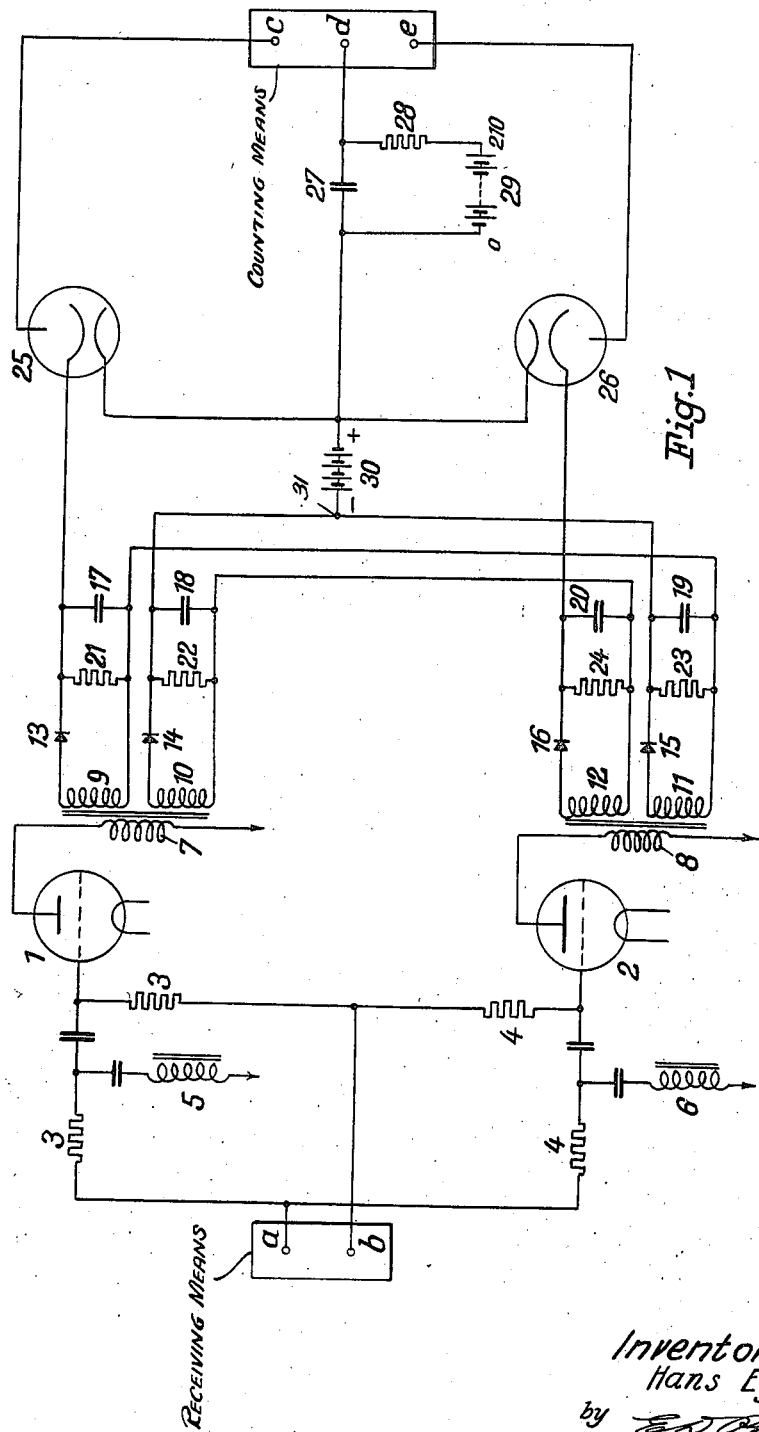

Oct. 7, 1941.  H. EGGERS  2,258,006

DIRECTION FINDING SYSTEM

Filed Dec. 17, 1938  2 Sheets-Sheet 1

Inventor:
Hans Eggers
by E. D. Phinney
Att'y

Oct. 7, 1941.  H. EGGERS  2,258,006
DIRECTION FINDING SYSTEM
Filed Dec. 17, 1938  2 Sheets-Sheet 2
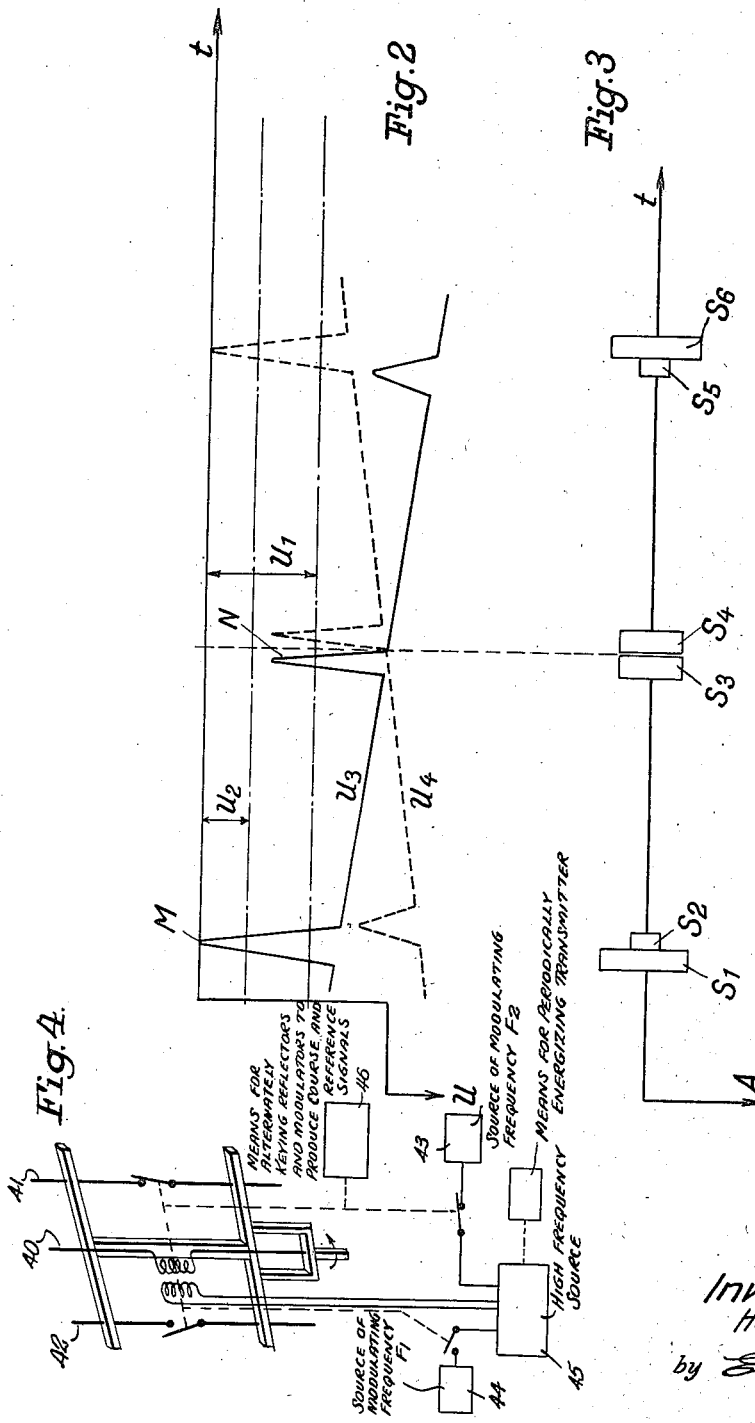
Inventor:
Hans Eggers
by E.D.Phinney
Att'y Patented Oct. 7, 1941

2,258,006

UNITED STATES PATENT OFFICE 2,258,006

DIRECTION FINDING SYSTEM

Hans Eggers, Berlin, Germany, assignor to C. Lorenz Aktiengesellschaft, Berlin-Tempelhof, Germany, a company Application December 17, 1938, Serial No. 246,300
In Germany December 11, 1936

6 Claims. (Cl. 250—11)

The present invention relates to direction finding systems, and more specifically to methods of and means for determining positions by means of rotating radio beacons.

It is well known for the purpose of determining positions to emit from a radio transmitter system a continuous succession of two alternately keyed directional radiations of different kind, such as dots and dashes, in such manner that the signals of one kind, such as dots, are rendered effective during the ineffectiveness of the signals of the other kind, such as dashes, to cause these signals of different kind to produce a line of equal field intensity on which they amalgamate to a continuous dash note, and to subject the radiation patterns forming said continuous dash to rotation. At the instant when the rotating continuous dash passes through a given reference direction, the north point, for example, the radio transmitter system radiates a non-directional signal. The time which elapses between the receipt of the continuous dash and of the non-directional signal is then determined in the receiving station as position indication. Such a beacon arrangement is illustrated, for example, in the patent to E. Kramar, No. 2,025,212, granted December 24, 1935. It is also a known method to count in a counting mechanism the number of signals of different kind received and to subtract the different signals from one another. The difference so ascertained in a simple manner determines the direction of the receiver with respect to the radio transmitter system. Moreover, an arrangement has been proposed in cooperation with the above mentioned counting mechanism according to which the picked up signals are applied to a relay combination through a transformer. The individual relays of this combination are directionally responsive to voltage impulses and mutually block each other in such a manner that the energization of one relay locks the other relays. The output circuits of these relays actuate the counting mechanisms. This known arrangement cooperates with a transmitter which emits dots and dashes which together form a continuous dash note. The patent to Müller, No. 2,156,060, granted April 25, 1939, illustrates by way of example such a counting receiver. The transformers forming part of this known receiving system do not respond to the signals as such, but to voltage peaks of different direction. However, the above explained method according to which the voltage peaks at the commencement of the signals actuate the counting mechanism introduces substantial disadvantages, since extraneous impulses, usually due to atmospheric influences of short duration or to spark phenomena having their origin in electrically ignited combustion engines involve the same action upon the receiver as signals picked up from a radio transmitter. Signals of this nature are likewise counted on the receiving side so that the result of the counting action becomes so vague that it will be impossible in many cases to adopt such system for effecting position determination.

The present invention proposes a method of determining positions by means of rotating radio beacons which method does not suffer under the disadvantage that extraneous influences affect the receiving equipment. The method according to the invention is characterized in this that the receiving equipment is influenced by the integral of the entire signal instead of by the voltage peaks at the commencement of the signal.

The invention will be more readily understood from the following description taken in conjunction with the accompanying drawings, in which Fig. 1 is a wiring diagram of the final stage of a receiving system, while the Figs. 2 and 3 diagrammatically illustrate voltage characteristics explanatory to the invention and Fig. 4 is a diagrammatic illustration of a transmitter for use in the system of my invention.

It will hereinafter be assumed that a radio transmitter (Fig. 4) comprises a radiating dipole 40 and two reflecting antennae 41, 42 which in cooperation emit two directional radiation patterns and, consequently a line of equal field intensity through the points of intersection between said two patterns. The radiating dipole is, for instance, fed by a carrier frequency from source 45 which is modulated with energy from 43, 44 by another frequency for each of the different radiation patterns. It will be assumed by way of example that one of the patterns is modulated with a tone-frequency F1 of 3,000 cycles per second and that the other pattern is modulated by another tone-frequency F2 of 5,000 cycles per second. Preferably non-harmonic frequencies will be used. The directional radiation patterns are keyed by means 46 so as to be rendered effective one after the other for a short period of time, whereupon this short succession of different signals is followed by a silent or ineffective interval. These signals are picked up by the receiver in accordance with the graphic diagram of Fig. 3 in which the signal amplitude A is plotted dependent upon time $t$. During the rotary movement of the radiation patterns the receiver is first influenced by the momentary keying of the first pattern, the voltage of which is represented by the rectangle S1 in Fig. 3, and then by the effectiveness of the second pattern as shown in Fig. 3 at S2. During the succeeding silent or ineffective interval of longer persistence, the radiation patterns or the antennae continue to rotate, e. g. through an angle equal to .5 degrees, whereupon the antennae are again momentarily rendered effective in the same manner as heretofore explained. Now, the receiver picks up the voltages S3 and S4 which in the embodiment under consideration coincide with the line of equal field intensity. The patterns or antennae still continue their rotary motion during an ineffective or silent interval of exactly the same duration as the above mentioned first interval. At the end of this second silent interval the antennae are again keyed with the result that the voltages S5 and S6 are detected by the receiver. The voltages S1 to S6 which are detected on the vehicle by a receiver (not shown) and which occur in the rectifier output circuit of said receiver as two tone-frequency alternating currents are impressed upon the counting device shown in Fig. 1 over the terminals $a$ and $b$.

The input stage of the counting arrangement comprises two tubes 1 and 2. For the purpose of being amplified, the two tone-frequency voltages above referred to are applied to the grids of said tubes through capacitor- resistor coupling means 3 and 4. Preceding each of said tubes there is provided a series resonance circuit 5 and 6, respectively. Each of these resonance circuits is tuned to one of the two tone-frequencies in order to secure that only one of said frequencies is applied to and amplified in the corresponding tube. Series resonance circuits adapted to dissipate the frequency which is not to be amplified in the succeeding tube are preferably used, since in cases of a syntonic amplification of the tone-frequencies, which method at first might be deemed adequate, the build up time of parallel resonance circuits would be too extended. Each anode circuit of the tubes 1 and 2 comprises a transformer 7 and 8, respectively, to which the amplified tone-frequencies are applied, e. g. that of 3,000 cycles per second to the transformer 7 and that of 5,000 cycles per second to the transformer 8. The secondary side of each transformer consists of two different windings 9, 10 and 11, 12, respectively, from which the tone-frequencies are derived and then rectified by means of the dry rectifiers 13, 14, 15 and 16. Each rectified voltage is applied across its cooperating condensers 17, 18, 19, 20 and a resistance 21, 22, 23, 24 in parallel relation therewith. Moreover, controlled ionization valves 25 and 26 are included in the above mentioned rectifying circuits, through which a condenser 27 is caused to discharge, the charging circuit for this condenser being formed by a high ohmic resistance 28 and a current source 29. The counting mechanism, as such known in the art, is connected to the terminals $c$, $d$, $e$. The controlled ionization valves are biased by a battery 30.

The manner in which the above described arrangement operates and the method of position determination by means of this arrangement are as follows: Each of the two momentary tone-frequency impulses represented by S1 and S2 in Fig. 3 arriving at the terminals $a$ and $b$ of Fig. 1 is applied to the appertaining tube 1 and 2, respectively, where they are amplified. A portion of the amplified tone-frequency S1 is rectified by rectifier 13. The resulting direct voltage charges the condenser 17. The voltage relations at the ionization valve 25 which is controlled by this charging potential are diagrammatically shown in Fig. 2. The battery 30 supplies this valve with a biasing potential U1, while U2 represents the ignition voltage. A voltage in excess of this value causes the valve to breakdown and the condenser 27 to be discharged. The characteristic U3 of Fig. 2 illustrates the charging voltage at the condenser 17 in combination with the biasing voltage and this voltage at point M causes the breakdown of the valve and, hence the condenser 27 to be discharged. This discharge corresponds to the signal S1 of Fig. 3, hence, this signal is counted in the counting mechanism.

The second signal element of the first sequence of signals emitted by the transmitter on account of the momentary effectiveness of the second radiation patttern, that is, the signal S2 of Fig. 3, influences that part of the circuit arrangement of Fig. 1 which is allotted to the corresponding tone-frequency, so that an impulse is produced in this part or half of the circuit which comprises the circuit elements 2, 4, 6, 8, 12, 16 and 20 and which exactly corresponds to the first part or half heretofore referred to in conjunction with the operation in response to the first signal S1. This impulse is shown in the dashed curve U4 of Fig. 2. However, this impulse is insufficient for causing the breakdown of the pertaining ionization valve 26. Consequently, a counting is effected in the counting mechanism between the terminals $c$ and $d$ only.

The rectifier 14 which is interposed in the second secondary winding of transformer 7 has for its object to fulfill the following function: Also this element 14 rectifies a portion of the corresponding tone-frequency which is smoothed by condenser 18 and applied as an additional biasing potential to the other part or half of the push-pull circuit over the junction 31. The condenser 18 is so dimensioned that the alternating current pulses are substantially converted into a direct voltage which is added as an additional bias to the biasing potential from the source 30. This bias may thus be considered as the voltage from battery 30, and the drop in resistances 22, and 24 applied to the grid of tube 26. In the other part or half of the circuit, the rectifier 15 and the condenser 19 fulfill the same functions. As a consequence, the breakdown voltage of tube 25, must be sufficient to overcome the bias of battery 30 and the bias applied from condenser 19. This latter bias is increased as the signal strength applied over tube 2, increases, causing curve U3, of Fig. 2, to have the downward slope illustrated. The additional biasing potential in dependency upon the amplitude of the other of the two signals involves the essential advantage that the line of equal field intensity is more sharply defined because of the fact that at those points where there is a difference between the amplitudes of the different tone-frequencies, such difference is still increased by means of the additional bias, while on the line of equal field intensity the two additional biasing potentials compensate each other so that they remain ineffective, since in the latter case the voltages N in Fig. 2 will not reach the ignition voltage U2. Hence, none of the ionization valves will be caused to breakdown.

The position determination is accomplished in accordance with any known method. The essential feature according to the present invention is that the individual signals are rendered effective at the controlled valves as integrals of a rectified tone-frequency, but not as a voltage peak thereof. It is thus impossible that extraneous interference impulses may give rise to false indications.

The method of employing momentary keying of the directional radiation patterns and to insert longer silent intervals between the short effective ones is based upon the following reasons: Position determinations above referred to are preferably made on airplanes. The amplitude of the signals received by the aeroplane is in the most cases modulated with the propeller frequency, since the propeller itself, either through inherent oscillations or through shielding means thereof, varies the picked up energy. If a continuous reception would be used, the propeller frequency would inevitably affect the indication and introduce difficulties.

Moreover, it is also of great importance in connection with the above disclosed arrangement to maintain constant the ratio of the degrees of modulation of the tone-frequencies. Means must therefore be provided at the transmitting system in order to keep constant the degree of modulations or the ratio of the modulation degrees to one another. Also the receiving system must be so designed that this ratio will remain unchanged. The heretofore described embodiment of a rotating radio beacon may, for instance, be keyed so as to be effective during one half revolution and ineffective during the second half revolution during which latter the counting operation is accomplished.

In accordance with a further feature of the invention, the radio beacon is keyed also during the ineffective or silent interval of one half revolution without producing any directional radiation patterns. This may be accomplished by way of example by transmitting the tone-frequencies according to the above mentioned intervals without keying the reflectors. In this case the correct adjustment of the biasing potentials of the ionization valves is automatically subjected to a continual supervision since the not keyed radiation patterns act as a line of constant field intensity which is not permitted to actuate the counting mechanism. However, if the counting mechanism would actually be influenced during this period of time, the operation thereof would indicate that the biasing potentials are not correctly adjusted so that a readjustment will be required.

It is also possible according to still a further feature of the invention to use a frequency above the audible frequency range instead of the tone-frequencies referred to in the embodiment heretofore described. The use of such higher frequency involves the advantage that the filtering means and the coupling members forming part of the push-pull equipment may be simplified.

What is claimed is:

1. In a radio direction finding system, a radio beacon transmitter comprising a radiating dipole, a generator feeding said dipole, two reflectors, keying means for momentarily rendering said reflectors effective one after the other to successively produce directional radiation patterns composed of signals having predetermined amplitude time curves which set up a line of equal field intensity and for introducing an ineffective reflector interval after each effective reflector period, means to modulate each of said radiation patterns with a different distinguishing frequency, and means to subject said patterns to a continuous rotation, and a radio receiving equipment comprising a detector circuit to pick-up said modulated signals from said transmitter, a push-pull arrangement coupled with the output of said detector circuit and having two halves each of which responds to one of said distinguishing frequencies applied thereto from said detector circuit, a counting mechanism connected to said push-pull arrangement for counting the signals applied thereto, and means for actuating said counting mechanism in response to the integral of the amplitude time curve of each individual received signal picked-up by said receiving equipment as determined by the instantaneous directional alignment of said radiation patterns.

2. In a radio direction finding system as set forth in claim 1, in which each half of said push-pull arrangement of the receiving equipment comprises a rectifier, a condenser charged from said rectifier, and an ionization valve controlled by said condenser.

3. In a radio direction finding system as set forth in claim 1, in which the input circuit of each half of said push-pull arrangement comprises an amplifying tube preceded by a series resonance circuit tuned to frequency which is not to be applied to the corresponding half of said push-pull arrangement.

4. In a radio direction finding system as set forth in claim 1, in which means are provided in the output circuit of each half of said push-pull arrangement for rectifying a portion of the output energy and to apply this rectified energy as a biasing potential to the other half thereof.

5. In a radio direction finding system as set forth in claim 1, in which said means for modulating said directional radiation patterns momentarily rendered effective at said transmitter comprises different tone-frequency sources.

6. In a radio direction finding system as set forth in claim 1, in which said means for modulating said directional radiation patterns momentarily rendered effective at said transmitter comprises different sources of frequency above the audible range.

HANS EGGERS.